UNITED STATES PATENT OFFICE.

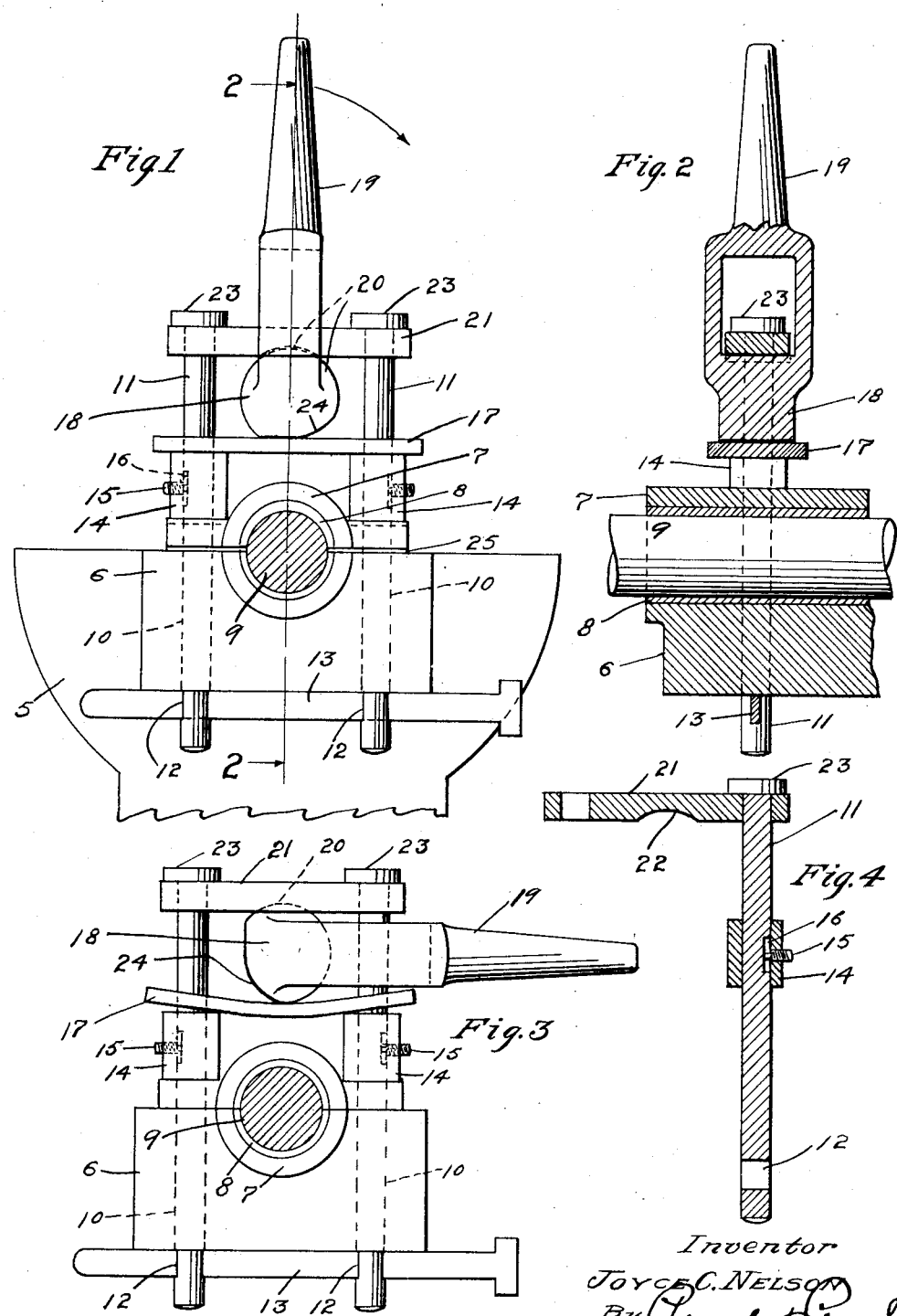

JOYCE C. NELSON, OF TRACY, MINNESOTA, ASSIGNOR OF ONE-THIRD TO GEORGE T. SCHESVOLD, OF MINNEAPOLIS, MINNESOTA, AND ONE-THIRD TO ROBERT J. NELSON, OF GALES, MINNESOTA.

CLAMPING DEVICE FOR BEARINGS.

1,388,290.  Specification of Letters Patent.  Patented Aug. 23, 1921.

Application filed April 5, 1920. Serial No. 371,423.

*To all whom it may concern:*

Be it known that I, JOYCE C. NELSON, a citizen of the United States, resident of Tracy, county of Lyon, State of Minnesota, have invented certain new and useful Improvements in Clamping Devices for Bearings, of which the following is a specification.

My invention relates to an attachable device for clamping down the bearing cap of bearings when fitting bearings, especially babbitted bearing surfaces to the proper working condition for the shaft. In such bearings and more particularly high-speed gas engine bearings, it is customary to raise the bearing cap slightly above normal and run in a slight excess of babbitt in the bearings around the shaft to compensate for irregularities in the rough bearing and, after clamping down the cap tightly on the shaft, rotate the shaft by some outside power, to generate heat in the bearing by friction, which softens the Babbitt metal, conforms it to the shaft and produces a smooth uniform cylindrical bearing surface the entire length of the bearing. Ordinarily this so-called "burning in" process requires a number of removal and replacement fittings of the cap and when the proper bearing surface has been obtained it is again necessary to adjust the cap to a running fit for the shaft. The object is to facilitate the removal and replacements of the bearing cap by saving the time for unscrewing, removing and replacing the usual cap, nuts, or screws each time the cap must be adjusted, removed or replaced.

My invention consists in certain constructions and combinations hereinafter described and particularly pointed out in the claims.

In the accompanying drawings forming part of this specification,

Figure 1 is an end elevation of a device constructed according to my invention and mounted in position on an inverted engine bearing to be "burnt in."

Fig. 2 is a vertical section on the line 2—2 of Fig. 1.

Fig. 3 is a view similar to Fig. 1, but showing the position of the parts after the bearing has been fitted or "burned in."

Fig. 4 is a detail.

In the drawing, 5 represents the engine block or crank casing, inverted from the usual position to facilitate the babbitting and fitting of the bearings. 6 is the permanent bearing block, usually integral with the casing 5, and 7 is the removable cap, shown in Fig. 1 as slightly raised above the block 6 and resting on the babbitt ring 8 formed around the shaft 9. The usual bearing bolts have been removed from the holes 10 in the block 6 and the clamping rods 11 of my device are shown inserted through the holes 10. Slots 12 are provided in the rods 11 through which a locking key 13 is inserted, the upper edge of the key bearing against the under side of the bearing block 6 when the device is in place. Collars 14, resting on the cap 7 and having pins or screws 15, engaging ways 16 in the rods 11, loosely fit the rods and a flexible presser bar 17 rests on top of the collars 14, being guided by suitable openings through which the rods 11 pass. Normally resting on the top of the presser bar 17 is a cam member 18 having a forked operating lever 19. The upper portion 20 of the face of the cam is circular in form and is engaged by a strap or stop bar 21 in a curved recess 22. The bar 21 is loosely mounted on the rods 11 guided by suitable holes through which the rods pass and held in place by abutting heads 23 on the upper ends of the rods 11. The circular face 20 of the cam 18 is cut away on the underside of the cam when it is in normal position, forming the cam face 24, which will engage and depress the presser bar 17. The length of the rods 11 and collars 14 are adjusted so that for any size bearing of standard manufacture the distance between the presser bar 17 and stop bar 21 is such that normally before operation begins the lower cut away part of the cam will rest on the presser bar 17 and the upper circular face 20 will be guided in the recess 22 in the stop bar 21.

In practice, the device is assembled on the bearing block 6, as in Fig. 1, preferably with suitable shims 25 between the block 6 and cap 7. The babbitt is then poured into the bearing after which the shims 25 are removed. Power is now applied to revolve the shaft by any suitable means, not shown, and at the same time the operator depresses the lever 19 in the direction of the arrow in Fig. 1, flexing the presser bar 17 downward and applying pressure on the cap 7 or the lever may first be forced down to the position shown in Fig. 3 and then the shaft revolved to burn in the bearing. The friction heat developed under the pressure by the revolving shaft softens the babbitt, and irregularities in the bearing surface will tend to conform to the smooth circular form of the revolving shaft. When the operator desires to remove the device for inspection, the lever is returned to the position in Fig. 1 and the key 13 is removed from the slots 12, when the device may be readily lifted off and the cap 7 will be free for removal and inspection. The pins 15 in the collars 14 engaging the ways 16 in the rods 11, will keep the parts from disassembling when the device is removed from the bearings. After inspection and adjustment the device may be readily and quickly replaced in operating position on the bearing and the key 13 inserted, and the operations may be repeated as often as is necessary to properly aline and fit the bearing until the parts assume the position in Fig. 3, when the bearing will be finished.

The babbitt may be and usually is poured into the bearing before the clamp is put in place.

It is obvious that various details of construction may be modified without departing from the principles and scope of the invention and I do not, therefore, limit myself to the exact construction shown.

I claim as my invention:

1. The combination, with a bearing block, of guide rods mounted therein, a cap mounted for vertical movement on said rods and between which and said block the shaft is seated, a presser bar vertically movable on said rods, and means for exerting a downward pressure on said bar and bearing cap.

2. The combination, with a bearing block, of a bearing cap between which and said block the shaft is seated, guides for said cap, a flexible presser bar and means for forcing said presser bar and said cap toward said bearing block.

3. The combination, with a bearing block, of a bearing cap between which and said block the shaft is inserted, guides mounted on said block, a flexible presser bar carried by said guides and a lever device mounted to engage said presser bar and force said bearing cap toward said block.

4. The combination, with a bearing block, of a bearing cap between which and said block a shaft is seated, guides mounted on said block, collars movable in said guides and seated on said cap, a flexible presser bar mounted on said guides and seated on said collars, and a cam lever mounted to engage said presser bar.

5. The combination, with a bearing block, of guide rods removably mounted therein in parallel relation, a bearing cap slidable on said guide rods, a presser bar slidable on said rods and mounted to exert a downward pressure on said cap and a cam lever mounted to engage said bar.

6. A clamping device for bearings comprising a guide for the bearing cap to allow it to be raised to run an excess of babbitt between it and the shaft, and a lever device coöperating with said guides for clamping said cap to grip the babbitt between it and the shaft.

In witness whereof, I have hereunto set my hand this 25" day of March, 1920.

JOYCE C. NELSON.